(12) United States Patent
Kanie

(10) Patent No.: US 8,308,347 B2
(45) Date of Patent: Nov. 13, 2012

(54) HIGH-PRESSURE TANK TEMPERATURE DETECTION SYSTEM AND HIGH-PRESSURE TANK SYSTEM

(75) Inventor: Naoki Kanie, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 597 days.

(21) Appl. No.: 12/523,467

(22) PCT Filed: Feb. 22, 2008

(86) PCT No.: PCT/JP2008/053582
§ 371 (c)(1),
(2), (4) Date: Jul. 16, 2009

(87) PCT Pub. No.: WO2008/105522
PCT Pub. Date: Sep. 4, 2008

(65) Prior Publication Data
US 2010/0098130 A1   Apr. 22, 2010

(30) Foreign Application Priority Data
Feb. 22, 2007   (JP) .................................. 2007-041840

(51) Int. Cl.
*G01K 15/00*   (2006.01)
*G01K 7/16*   (2006.01)
(52) U.S. Cl. ............ 374/1; 374/208; 374/183; 374/143; 374/54

(58) Field of Classification Search ............ 374/1, 183, 374/143, 54
See application file for complete search history.

(56) References Cited

U.S. PATENT DOCUMENTS 4,766,557 A * 8/1988 Twerdochlib .................... 702/51
5,487,300 A * 1/1996 Brackett et al. .............. 73/61.59

FOREIGN PATENT DOCUMENTS

| JP | 63-139224 | A | | 6/1988 |
|----|-----------|---|---|--------|
| JP | 1-33065 | Y2 | | 10/1989 |
| JP | 4-175439 | A | | 6/1992 |
| JP | 7-085883 | A | | 3/1995 |
| JP | 11-281499 | A | | 10/1999 |
| JP | 2000-193533 | A | | 7/2000 |
| JP | 2001-255213 | A | | 9/2001 |
| JP | 2002054513 | A | * | 2/2002 |
| JP | 2005-156389 | A | | 6/2005 |
| JP | 2006-083943 | A | | 3/2006 |

* cited by examiner

*Primary Examiner* — Lisa Caputo
*Assistant Examiner* — Mirellys Jagan
(74) *Attorney, Agent, or Firm* — Kenyon & Kenyon LLP

(57) ABSTRACT

In a hydrogen tank, discharge of a hydrogen gas may cause lowering of the temperature to a value at which it is assumed that disconnection has occurred in a thermistor. A temperature detection system for the hydrogen tank estimates the possibility that the temperature of the hydrogen tank is below this temperature value, according to the ambient temperature and the internal pressure. Only when there is no possibility that the temperature is below the value, disconnection is judged to have occurred.

10 Claims, 5 Drawing Sheets

HIGH-PRESSURE TANK TEMPERATURE DETECTION SYSTEM AND HIGH-PRESSURE TANK SYSTEM

This is a 371 national phase application of PCT/JP2008/053582 filed 22 Feb. 2008, claiming priority to Japanese Patent Application No. JP 2007-041840 filed 22 Feb. 2007, the contents of which are incorporated herein by reference.

TECHNICAL FIELD

The present invention relates to a technology for performing temperature detection of a high-pressure tank, and more particularly to a technology for performing failure judgment of a temperature sensor.

RELATED ART

The following Patent Reference 1 describes a technology of disposing a temperature-detecting reference resistor and a disconnection-detecting reference resistor in order to detect disconnection while securing detection accuracy of a thermistor temperature detector. The following Patent Reference 2 discloses a structure to detect disconnection of a thermistor temperature detector. The following Patent Reference 3 discloses a structure to detect a failure such as disconnection or short-circuit of a thermistor temperature detector. The following Patent Reference 4 discloses a technology to detect disconnection based on a degree of temperature elevation involved in temperature measurement of an electric drive unit by a thermistor temperature detector.
Patent Reference 1: JP-A 11-281499 (KOKAI)
Patent Reference 2: JP-A 2005-156389 (KOKAI)
Patent Reference 3: JP-A 2000-193533 (KOKAI)
Patent Reference 4: JP-A 2001-255213 (KOKAI)

SUMMARY

Problems to be Solved by the Invention

A high-pressure tank sometimes experiences a large change in weight, pressure, temperature, or the like due to charging or discharging of a fluid. The technology described in Patent References 1 through 4 might not be able to detect a failure with high accuracy due to a large change in the measurement environment. If the technology of the Patent Reference 1 is adopted, there is fear of an increase in a frequency of switching to a disconnection detecting reference resistor.

The present invention enhances failure detection accuracy of a temperature sensor for detecting a temperature in a high-pressure tank.

The present invention also improves reliability of temperature detection within the high-pressure tank.

Means for Solving the Problems

According to an aspect of the invention, there is provided a high-pressure tank temperature detection system, comprising a temperature sensor for detecting a temperature in a high-pressure tank into which a high-pressure fluid is charged; and a judgment unit for performing failure judgment of the temperature sensor according to a failure judgment condition, wherein the failure judgment condition is determined according to a fluid amount or its variation amount within the high-pressure tank.

The high-pressure tank is a container in which a high-pressure fluid is filled. High pressure here means a pressure higher than at least atmosphere pressure (1 atmosphere≈0.0001 MPa). Moreover, fluid means gas, liquid, or a mixture of gas and liquid. The temperature sensor is a device for detecting a temperature state within the high-pressure tank, which is to be measured and retrieved as information such as voltage or current. The high-pressure tank temperature detection system is provided with a display device or a storage device and often performs an information-visualizing process or a process of storing the retrieved information.

The judgment unit is a unit for judging a failure of the temperature sensor according to a failure judgment condition and may be configured by software or hardware. The failure of the temperature sensor means a trouble causing a problem in the temperature detection by the temperature sensor. The failure of the temperature sensor may include a trouble caused in a peripheral device such as the above-described display device or storage device other than the trouble caused in the temperature sensor itself. A specific example of the failure can include short-circuit or disconnection in the temperature sensor having an electrical system. Moreover, the failure judgment condition is a condition for judging the occurrence of a failure and may be incorporated as software or hardware into the judgment unit.

In this failure judgment condition, the judgment of failure occurrence depends on one or both values of the fluid amount and its variation amount in the high-pressure tank, and changes in at least two stages. It may of course be varied in three or more stages or continuously (infinite stages). Here, the fluid amount in the high-pressure tank may be acquired by direct measurement (for example, pressure or weight measurement) or may be acquired by indirect measurement (for example, estimating from a charging amount or a discharging amount). Furthermore, a variation amount of the fluid amount may also be acquired by direct measurement or acquired by indirect measurement. The fluid amount or the variation amount may be evaluated (expressed) by weight, density, volume, or pressure, or may be evaluated by an amount indicating a value according to a fluid amount or a variation amount (for example, a vibration frequency, a refraction index, a meter rotational amount, or the like). In other words, the failure judgment condition may be a function of the fluid amount itself or the variation amount itself, or may be a function of another amount which is determined according to the fluid amount or the variation amount. The failure judgment condition may be determined further in accordance with an amount that depends on neither the fluid amount nor the variation amount.

By virtue of the above configuration, failure detection accuracy can be enhanced, because failure judgment of the temperature sensor is made according to the fluid amount or its variation amount in the high-pressure tank. Also, it becomes possible to improve reliability of the temperature detected by the temperature sensor.

According to an aspect of the invention, there is provided a high-pressure tank temperature detection system, wherein the failure judgment condition is a condition based on a comparison between a result detected by the temperature sensor and a failure judgment threshold value, wherein the failure judgment threshold value is determined according to a fluid amount or its variation amount in the high-pressure tank, thereby failure judgment condition is determined according to the fluid amount or its variation amount in the high-pressure tank.

By virtue of the above configuration, for example, when a temperature sensor whose detection characteristics are varied depending on the fluid amount or its variation amount is used, it becomes possible to enhance the failure detection accuracy by determining a failure judgment threshold according to the detection characteristics.

According to an aspect of the invention, there is provided the above-described high-pressure tank temperature detection system, wherein the failure judgment condition includes a first condition to determine whether or not the failure judgment can be made, and a second condition to judge whether or not a failure exists when the failure judgment can be made, and at least the first condition is determined according to a fluid amount or its variation amount in the high-pressure tank, thereby the failure judgment condition is determined according to a fluid amount or its variation amount in the high-pressure tank.

The first condition is a condition to determine whether the failure judgment is substantially made. In other words, the first condition can be a condition to determine whether or not the failure judgment is made or a condition to determine whether the results of the failure judgment made are handled as valid (when the failure judgment is always made formally). The second condition may be determined according to the fluid amount or its variation amount, or may be determined independently of them. By virtue of the above configuration, for example, it becomes possible to enhance the failure judgment accuracy when the possibility of performing the failure judgment or the failure judgment accuracy varies according to the fluid amount or its variation amount in the high-pressure tank.

According to an aspect of the invention, there is provided the above-described high-pressure tank temperature detection system, wherein the temperature detection system is provided with an estimation unit for estimating a temperature in the high-pressure tank according to a fluid amount or its variation amount in the high-pressure tank independent of the temperature sensor; and the first condition is a condition to determine whether the failure judgment can be made according to a temperature estimated by the estimation unit, thereby the first condition is determined according to a fluid amount or its variation amount in the high-pressure tank.

Generally, the fluid temperature is variable depending on the change in the fluid amount in the high-pressure tank. The estimation unit estimates the fluid temperature depending on the fluid amount or its variation amount in the high-pressure tank. The estimation may be made according to thermodynamic finding or may be performed according to experimental results or empirical rules. The temperature of the high-pressure tank asymptotically approaches the ambient temperature of the high-pressure tank with elapse of time. Accordingly, the estimation unit may estimate the fluid temperature according to the elapsed time after the change in fluid amount.

According to an aspect of the invention, there is provided the above-described high-pressure tank temperature detection system, wherein the temperature detection system is provided with an estimation unit for estimating a temperature in the high-pressure tank according to a fluid amount or its variation amount in the high-pressure tank independent of the temperature sensor; and the first condition is a condition to determine that the failure judgment can be made when the temperature estimated by the estimation unit is in a range where the temperature detection can be made by the temperature sensor, thereby the first condition is determined according to a fluid amount or its variation amount in the high-pressure tank. By virtue of the above configuration, for example, the failure judgment accuracy can be enhanced when the possibility of performing the failure judgment or the failure judgment accuracy varies depending on the temperature in the high-pressure tank.

According to an aspect of the invention, there is provided the above-described high-pressure tank temperature detection system, further comprising an acquisition unit for acquiring an ambient temperature around the high-pressure tank, wherein the estimation unit estimates a temperature in the high-pressure tank further in accordance with the ambient temperature. The temperature in the high-pressure tank substantially agrees with the ambient temperature of the tank in a temperature equilibrium state. Accordingly, to estimate a temperature after the temperature change, there may be adopted a configuration to consider the ambient temperature of the tank as a temperature before the change. Otherwise, the ambient temperature of the tank may be considered in a process of becoming closer to the temperature equilibrium state again after the temperature change.

According to an aspect of the invention, there is provided the above-described high-pressure tank temperature detection system, further comprising matching information for matching a fluid amount or its variation amount in the high-pressure tank and feasibility of the failure judgment, according to the first condition, wherein the judgment unit performs failure judgment of the temperature sensor according to the matching information. For example, the matching information may be implemented as a table or may be implemented in the form of functions.

According to an aspect of the invention, there is provided the above-described high-pressure tank temperature detection system, comprising an acquisition unit for acquiring an ambient temperature around the high-pressure tank, wherein the matching information performs matching of the fluid amount or its variation amount in the high-pressure tank, the ambient temperature, and feasibility of the failure judgment.

According to an aspect of the invention, there is provided the above-described high-pressure tank temperature detection system, wherein the fluid to be charged into the high-pressure tank is in the form of gas.

According to an aspect of the invention, there is provided the above-described high-pressure tank temperature detection system, wherein the temperature sensor is a thermistor. The thermistor is a temperature sensor using a semiconductor and detects a temperature according to a characteristic that the electric resistance of the semiconductor is largely variable depending on a temperature.

According to an aspect of the invention, there is provided the above-described high-pressure tank temperature detection system, further comprising a unit for detecting a pressure in the high-pressure tank, wherein a fluid amount or its variation amount in the high-pressure tank is evaluated according to the detected pressure or pressure change. The fluid amount or its variation amount can be evaluated (or can be expressed) according to various quantities such as weight, density, and the like. Here, a determination is made to evaluate according to the pressure.

According to an aspect of the invention, there is provided the above-described high-pressure tank temperature detection system, wherein the variation amount is evaluated according to a difference between the fluid amount in the high-pressure tank and a reference fluid amount. The reference fluid amount includes, for example, a fluid amount which is attained by ordinary charging, a fluid amount attained by the ordinary discharging, and a measured or predetermined fluid amount at a predetermined time. The reference fluid amount may be determined according to input or may be determined to be a fixed value.

According to an aspect of the invention, there is provided a high-pressure tank system, comprising the high-pressure tank temperature detection system and the high-pressure tank.

EXPLANATION OF REFERENCE NUMERALS

10: Fuel-cell car, 12: vehicle body, 14: wheels, 16: hydrogen tank, 18: pressure sensor, 20: thermistor, 22: fuel cell, 24: motor, 26: temperature sensor, 28: arithmetic unit, 30: temperature conversion section, 32: conversion table, 34: failure judgment section, 36: judgment table, 38: display device, 40: storage device.

DETAILED DESCRIPTION

Embodiments of the invention are exemplified below.

Figure 1:
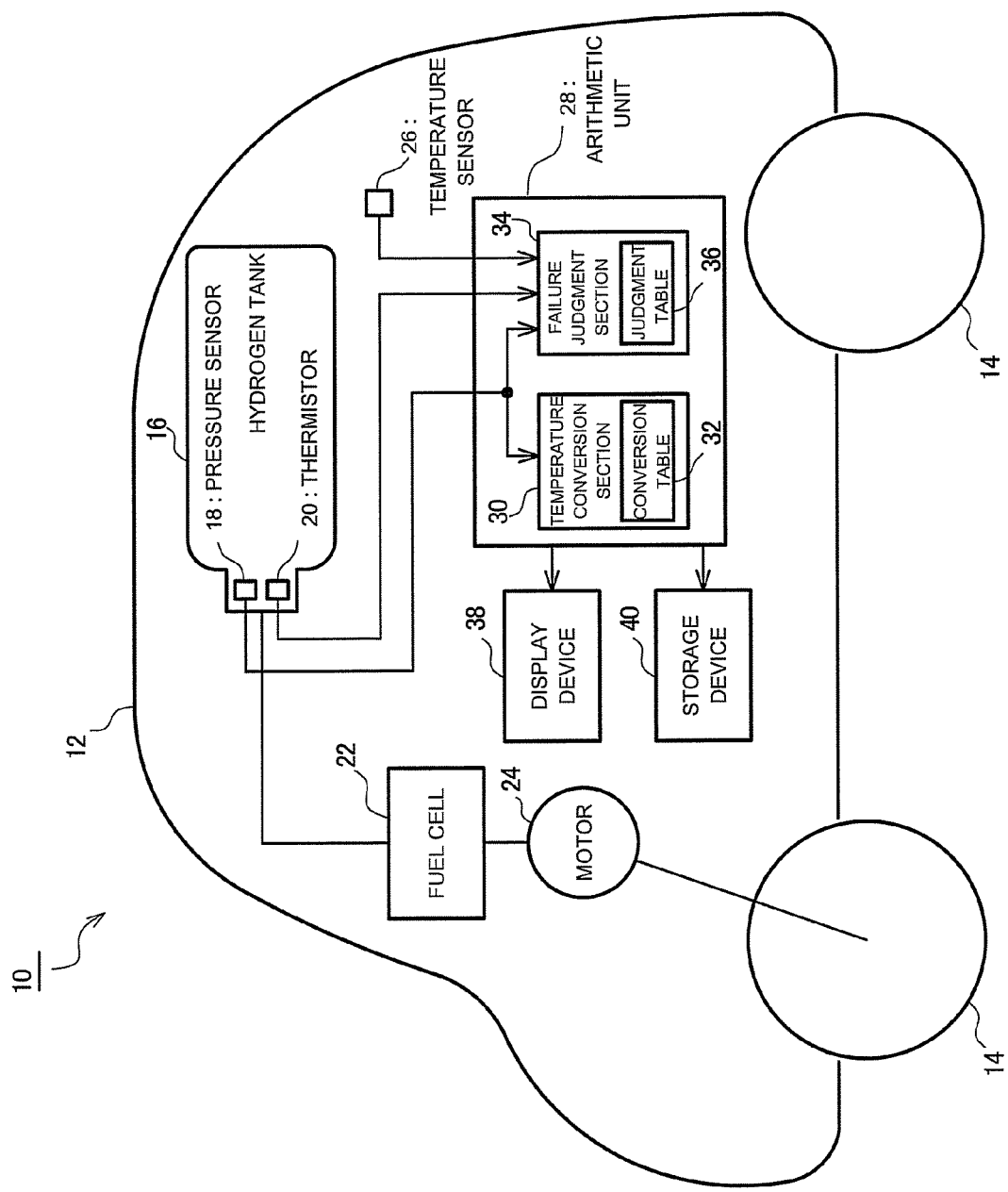
FIG. 1 is a diagram illustrating a structure of a fuel-cell car according to an embodiment.

FIG. 1 is a schematic diagram illustrating a structure of a fuel-cell car 10 according to an embodiment. The fuel-cell car 10 is a vehicle provided with a vehicle body 12 and four wheels 14. The fuel-cell car 10 has a single or multiple hydrogen tanks 16 as high-pressure tanks. The hydrogen tank 16 is filled with hydrogen gas in a fluid form, and a pressure sensor 18 for detecting an internal pressure and a thermistor 20 which is a temperature sensor for detecting an internal temperature are provided in the vicinity of a valve.

The fuel-cell car 10 is also mounted with a fuel cell 22 and a motor 24. The fuel cell 22 is a device for generating electricity by chemically reacting the hydrogen gas discharged from the hydrogen tank 16 with oxygen contained in the air. The motor 24 converts the generated electric energy into rotation energy and transmits the same to the wheels 14 to run the fuel-cell car 10.

A temperature sensor 26 for detecting a temperature (outside temperature) around the hydrogen tank 16 is also mounted on the periphery thereof. The fuel-cell car is mounted with an arithmetic unit 28, a display device 38, and a storage device 40. The arithmetic unit 28 is a computer which is called an ECU (electrical control unit) and a device which performs various types of information processing in relation to the fuel-cell car 10 according to a program. The arithmetic unit 28 is provided with a temperature conversion section 30 which converts the electrical signal (voltage) output from the thermistor 20 into a temperature. The temperature conversion section 30 is provided with a conversion table 32 which is generated according to the characteristics of the thermistor 20 and which is used to convert a voltage into a temperature. The arithmetic unit 28 is provided with a failure judgment section 34 which performs failure judgment of the thermistor 20 upon receiving the outputs from the pressure sensor 18, the thermistor 20, and the temperature sensor 26. The failure judgment section 34 is a device serving as a judgment unit and detects disconnection or short-circuit in the electrical system of the thermistor 20 with reference to a built-in judgment table 36. The judgment table 36 stores failure judgment conditions in the form of a table. Its features are described in detail later.

The display device 38 is a device having a LED (light-emitting diode), a liquid crystal monitor, and the like and shows the temperature converted by the temperature conversion section 30, failure information output from the failure judgment section 34, and the like. The storage device 40 is a device having a semiconductor memory and storing the temperature converted by the temperature conversion section 30, failure information output from the failure judgment section 34, and the like.

The hydrogen tank 16 is filled with hydrogen gas at a gas station, a maintenance facility, or the like. A charging amount is not necessarily limited, but a charging amount for filling up is generally determined (e.g., 70 MPa) in consideration of the capacity, pressure-resistant property, legal restrictions, and the like of the hydrogen tank 16, and charging is performed based on this determination. The charged hydrogen gas is discharged as the vehicle runs and is consumed by the fuel cell 22. When the internal pressure decreases to a level close to the atmospheric pressure, voluntary discharging of hydrogen gas from the hydrogen tank 16 becomes difficult, and it is presumed that the hydrogen tank 16 has become empty. Since atmospheric pressure is low enough in comparison with the pressure when the tank is full, below it is occasionally assumed that an amount when the hydrogen tank 16 becomes empty is approximately 0 MPa.

In the process of charging hydrogen gas into the hydrogen tank 16, the pressure (internal pressure of the hydrogen tank 16) of hydrogen gas increases depending on the charging amount, as is apparent from the equation of state of gas. In the hydrogen gas charging process, it is apparent from the first law of thermodynamics that the hydrogen gas receives the work by compression and increases in internal energy. In other words, the hydrogen gas has a high temperature depending on the charging amount. However, the hydrogen gas externally radiates heat through the hydrogen tank 16 and reaches thermal equilibrium with the circumference after lapse of a long time. In other words, the hydrogen gas temperature asymptotically approaches the ambient temperature (typically, external temperature).

Meanwhile, when the hydrogen gas is discharged from the hydrogen tank 16, the hydrogen gas pressure decreases depending on a discharging amount. Also, the hydrogen gas temperature gradually asymptotically approaches the ambient temperature after it has lowered depending on the discharging amount. The relationship between the charging amount or discharging amount and the pressure or temperature (and also its time change) can be predicted according to theoretical thermodynamics or experimental results.

Figure 2:
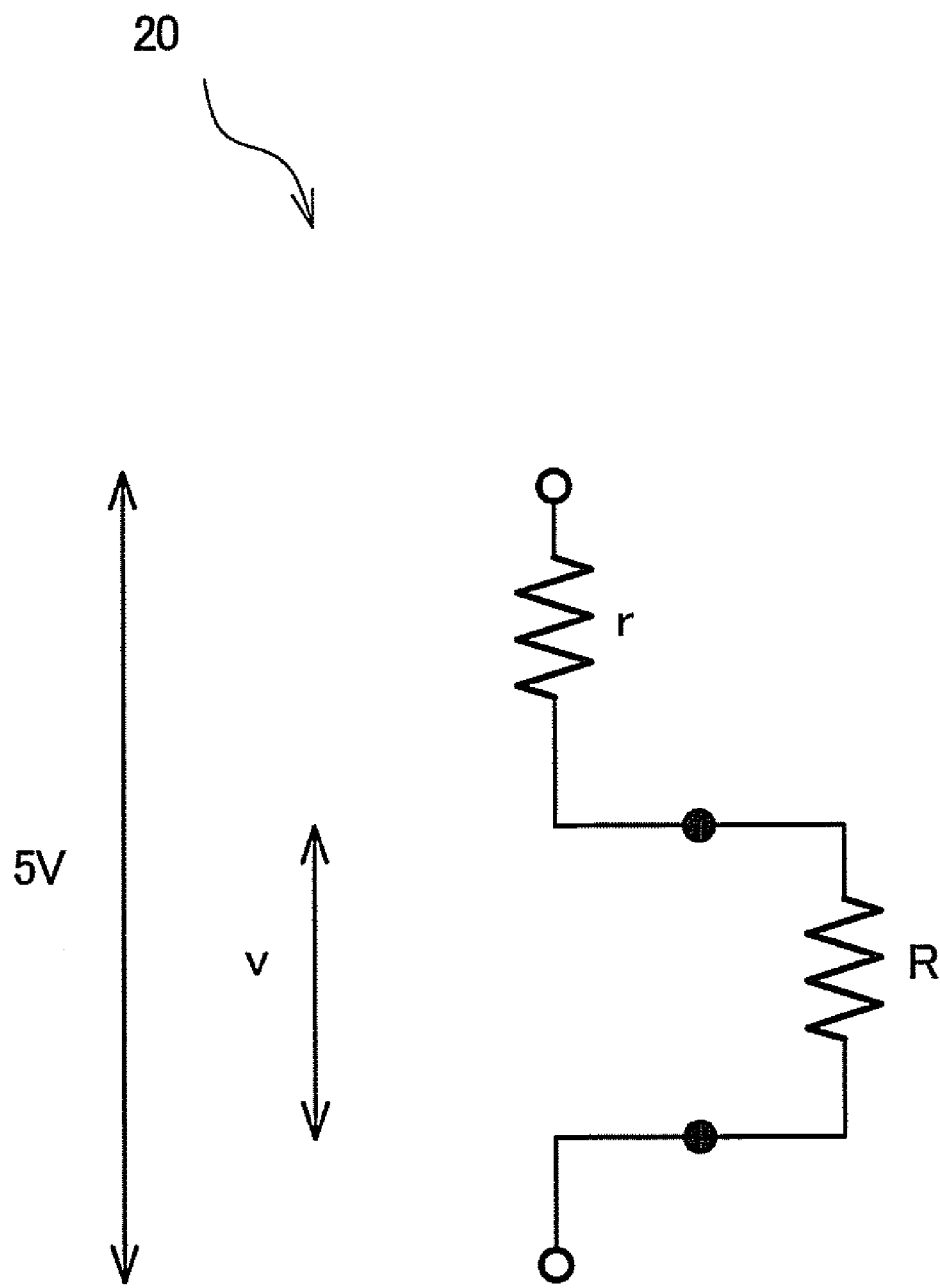
FIG. 2 is a schematic diagram illustrating an example structure of a thermistor.

Subsequently, the thermistor 20 for detecting a temperature within the hydrogen tank 16 is described below with reference to FIG. 2. FIG. 2 is a schematic diagram illustrating a structure example of the thermistor 20. For example, as shown in the drawing, the thermistor 20 is configured by directly connecting a resistor having electric resistance r which has low temperature dependency and becomes a criterion, and a semiconductor device which has electric resistance R which becomes smaller as the temperature increases (becomes larger as the temperature decreases) (this semiconductor device is occasionally called the thermistor, but in this embodiment, the temperature detection device including the above-described resistors is called the thermistor). Also, a reference voltage (5V here) is applied to both its ends. Therefore, voltage $v=5 R/(R+r)$ which is determined depending on the temperature is applied to the semiconductor device. A relationship between the voltage v and the temperature is previously incorporated into the conversion table 32 shown in FIG. 1, and the temperature conversion section 30 converts the voltage v into the temperature with reference to the conversion table 32.

Figure 3:
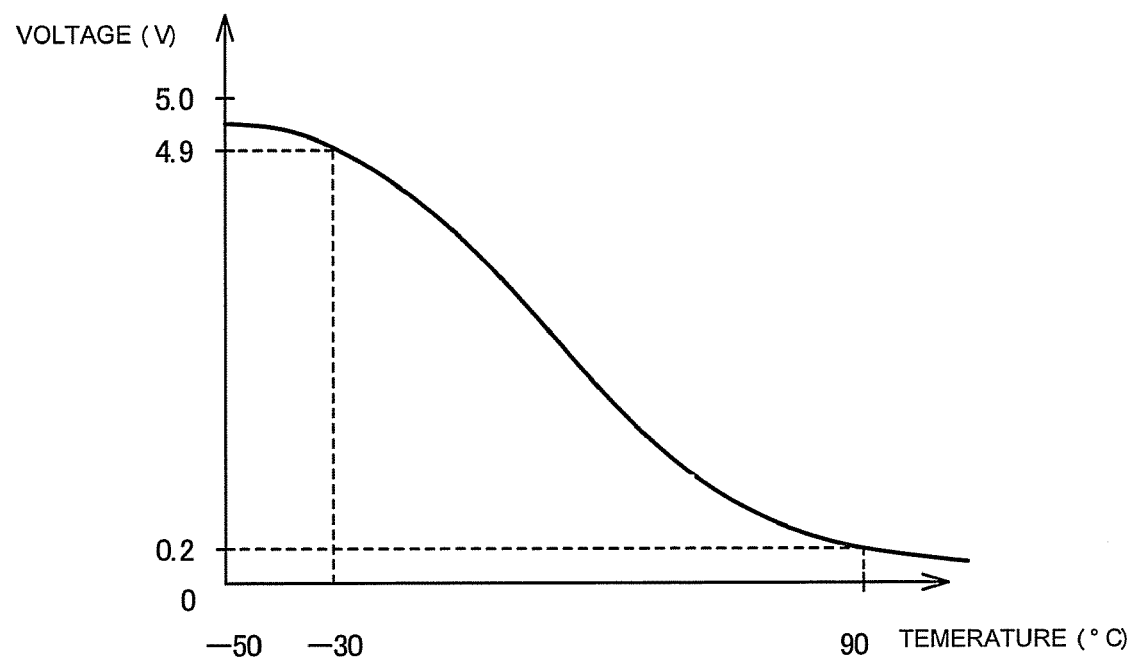
FIG. 3 is a diagram exemplifying a relationship between voltage and temperature of the thermistor.

FIG. 3 is a graph schematically showing a relationship between the voltage v (vertical axis) and temperature (horizontal axis) of the thermistor 20. When the temperature lowers, the electric resistance R of the semiconductor device becomes very large, and the voltage v becomes close to 5V. Conversely, when the temperature becomes high, the electric resistance R becomes very small, and the voltage v becomes close to 0V. In the illustrated example, when the temperature is −30 degrees C., the voltage v is 4.9V, and when it is 90 degrees C., the voltage is 0.2V.

The thermistor 20 is designed so that a range of −30 degrees C. to 90 degrees C.; namely, the voltage v in a range of 4.9V to 0.2V, becomes a detection range. Specifically, the thermistor is determined to have the electric resistance R of the semiconductor device and the electric resistance r of the resistor so as to have sufficient temperature resolution in the above detection range. Moreover, it is assumed that if the voltage v indicates a value not falling within the detection range, a failure is judged to have occurred. Specifically, if the voltage v is higher than the upper limit value of 4.9V, this indicates a state that the electric resistance R has become very large, and disconnection is assumed to have occurred. If the voltage v is lower than the lower limit value of 0.2V, this indicates a state that the electric resistance R has become substantially zero, and short-circuit is assumed to have occurred.

Judgment of a failure such as short-circuit or disconnection is made by the failure judgment section 34. The failure judgment section 34 makes failure judgment with reference to the judgment table 36, which is a table for matching the voltage v and the presence or absence of a failure. As described above, however, the hydrogen tank 16 causes a temperature change larger than that of the environment, depending on charging or discharging of the hydrogen gas. Therefore, the temperature has a possibility of attaining a level not falling within a detectable range of the thermistor 20, depending on a charging level or a discharging level.

Figure 4:
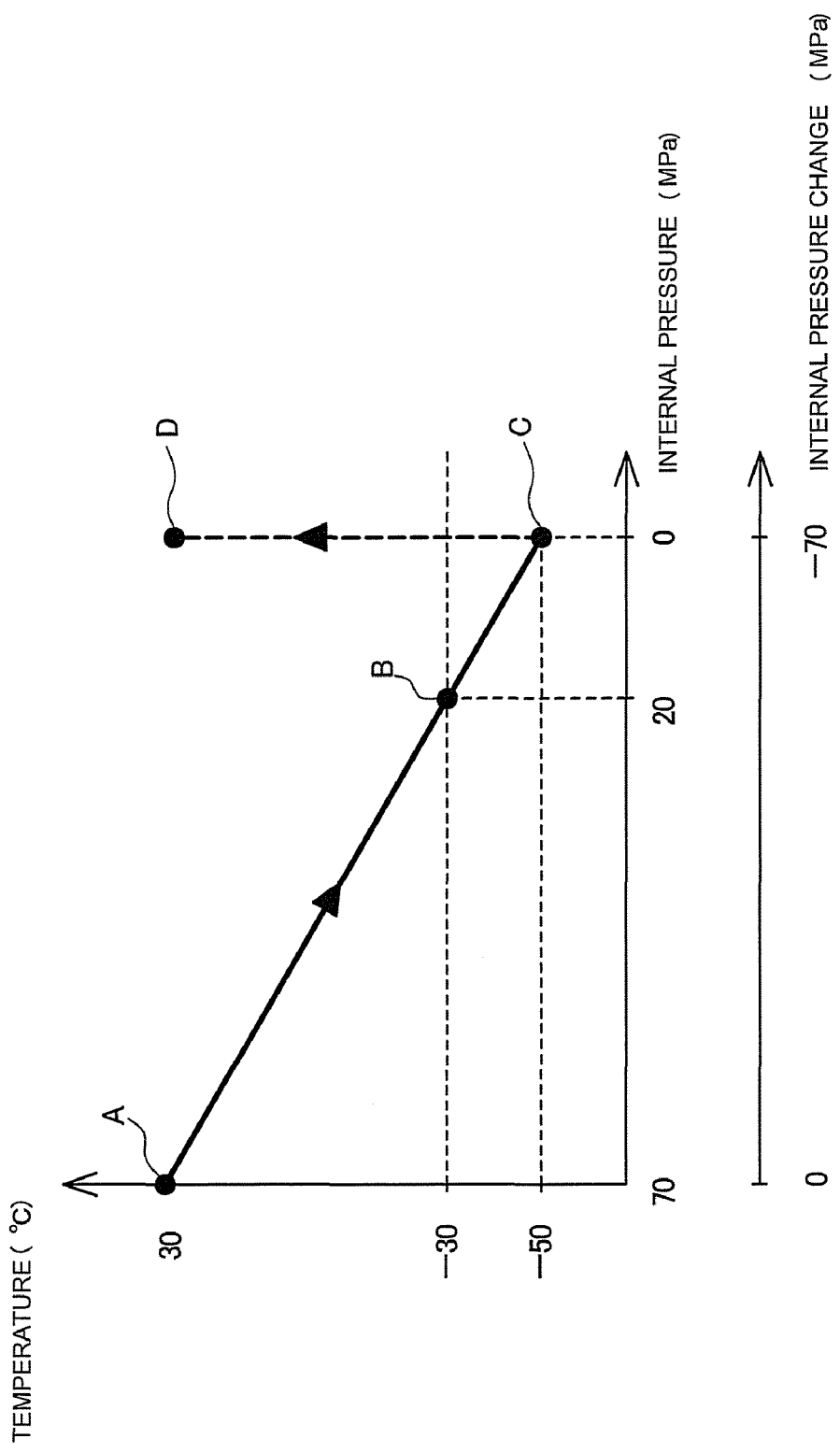
FIG. 4 is a diagram exemplifying a changing process of an internal pressure and temperature involved in discharge of hydrogen gas.

FIG. 4 is a graph illustrating an example of a case where the hydrogen tank 16 generates a temperature which is outside the range detected by the thermistor 20. The vertical axis of the graph represents the temperature of the hydrogen tank 16, and the horizontal axis represents the internal pressure of the hydrogen tank 16 and the changes of the internal pressure.

In the example of FIG. 4, the initial state is assumed to be such that the internal pressure and temperature of the hydrogen tank 16 are at point A on the graph. In other words, the hydrogen tank 16 is fully charged with hydrogen gas, and an internal pressure of 70 MPa is indicated. The hydrogen gas is in thermal equilibrium with the circumference, and its temperature is 30 degrees C., the same as the ambient temperature.

When the fuel-cell car 10 runs, the internal pressure and temperature of the hydrogen tank 16 change along the solid line in the drawing. In the illustrated example, the internal pressure and temperature decrease linearly to reach point C (internal pressure of 0 MPa, temperature of −50 degrees C.) via point B (internal pressure of 20 MPa, temperature of −30 degrees C.). Also, when the hydrogen tank 16 becomes empty, it is affected by the ambient temperature, and its temperature increases to come closer to point D (internal pressure of 0 MPa, temperature of 30 degrees C.). Actually, it is also considered that the hydrogen tank 16 shows a slight temperature increase due to an influence of the ambient temperature (diabatic effect) even in the process of the hydrogen gas decreasing. Such an influence can be estimated theoretically or experimentally.

In FIG. 4, when the hydrogen tank 16 has a state having reached point B, the hydrogen tank 16 has a temperature of −30 degrees C. or below. This temperature is a temperature at which the thermistor 20 has a voltage v of 4.9V or more and a temperature at which disconnection is assumed to have occurred. However, disconnection has not actually occurred. Therefore, the failure judgment section 34 shown in FIG. 1 does not make disconnection judgment if there is a possibility that the hydrogen tank 16 has a temperature of −30 degrees C. or below. Such a configuration is described below with reference to FIG. 5.

Figure 5:
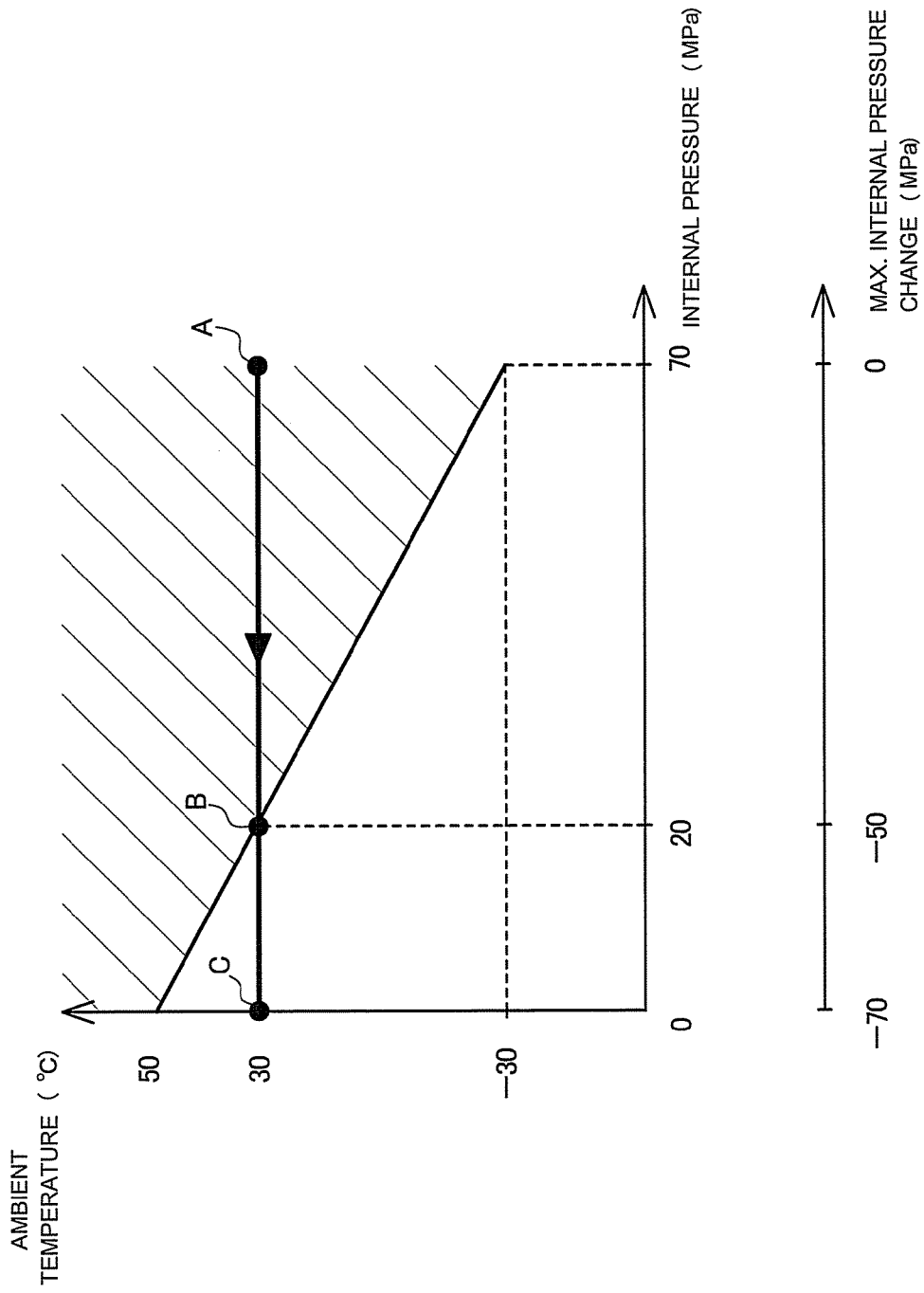
FIG. 5 is a diagram exemplifying a range within which disconnection judgment of the thermistor is performed.

FIG. 5 is a graph showing conditions that determine whether the failure judgment section 34 can make the disconnection judgment. The vertical axis represents the ambient temperature of the hydrogen tank 16, which is detected by the temperature sensor 26 of FIG. 1. The horizontal axis represents the internal pressure of the hydrogen tank 16 and the maximum internal pressure change. The internal pressure is a value measured by the pressure sensor 18 of FIG. 1. The maximum internal pressure change shows a maximum value which can be changed by discharging the hydrogen gas within a time when the internal pressure of the hydrogen tank 16, which was in thermal equilibrium with the ambient temperature, can be regarded as adiabatic. In the illustrated example, it is assumed that a duration in which the hydrogen tank 16 becomes empty from full when the fuel cell 22 is operated at high power is short such that the adiabatic approximation is realized, and the maximum internal pressure change agrees with a pressure decreased from the full internal pressure (70 MPa).

A thick solid line including points A, B, and C in FIG. 5 corresponds to the solid line including the points A, B, and C shown in FIG. 4. Since the solid line in FIG. 4 represents the changes in the hydrogen gas state at the ambient temperature of 30 degrees C., the solid line in FIG. 5 is drawn as a straight line indicating that the ambient temperature becomes 30 degrees C. The points A, B, and C are located at points where the internal pressure is 70 MPa, 20 Mpa, and 0 MPa. As described with reference to FIG. 4, when the hydrogen gas is discharged from the hydrogen tank 16 which is in thermal equilibrium state at the point A, the hydrogen gas lowers its temperature from 30 degrees C. and reaches −30 degrees C. when the internal pressure reaches the point B. Therefore, so far as the temperature is initially 30 degrees C. on a line segment AB in FIG. 5, the hydrogen gas does not fail to indicate a temperature of −30 degrees C. or more. For example, when the internal pressure (for example, 50 MPa) is lower than when the hydrogen tank is full and the ambient temperature is 30 degrees C., the inside of the hydrogen tank 16 does not become lower than −30 degrees C. even if the hydrogen gas is discharged until the internal pressure becomes 20 MPa. Meanwhile, the hydrogen gas has a possibility of showing a temperature of −30 degrees C. or below on the line segment BC in FIG. 5. Especially, when it is assumed that the thermal equilibrium state at the point A is an initial state, the temperature does not fail to become −30 degrees C. or below on the line segment BC if the hydrogen gas is discharged in a short time when it is regarded to be performed adiabatically.

Thus, the possibility that the hydrogen gas becomes lower than −30 degrees C. can be described as functions of the ambient temperature and internal pressure. From another point of view, the possibility that the hydrogen gas becomes lower than −30 degrees C. can be described as functions of the ambient temperature and maximum internal pressure changes.

In FIG. 5, the thin solid line passing through the point B represents a boundary which separates the existence and non-existence of the possibility that the hydrogen gas becomes lower than −30 degrees C. when the ambient temperature is changed. This thin solid line passes through the point where the internal pressure is 70 MPa when the ambient temperature is −30 degrees C. It is understood from the fact that if the internal pressure lowers, even if only slightly, the temperature lowers accordingly, and the temperature of the hydrogen gas immediately becomes lower than −30 degrees C. Moreover, the thin solid line shows that when the ambient temperature is 50 degrees C., the internal pressure is 0 MPa. This is because when the hydrogen gas is at 0 MPa, the maximum temperature change from the ambient temperature is merely −80 degrees C. (amount of decrease in temperature when the full hydrogen gas is completely discharged), and when the initial temperature is 50 degrees C., it becomes merely −30 degrees C.

In FIG. 5, the region (shaded area) on the upper right side of the thin solid line is a region where the hydrogen tank 16 is predicted not to become lower than −30 degrees C. The judgment table 36 of the failure judgment section 34 in FIG. 1 is configured to perform disconnection judgment only when the ambient temperature input from the temperature sensor 26 and the internal pressure input from the pressure sensor 18 fall within the shaded area. Namely, a check is made as to whether or not the voltage output from the thermistor 20 exceeds a judgment threshold value 4.9V, and the disconnection judgment is performed. If it is judged that disconnection has not occurred, the result of converting the voltage into the temperature is output. Meanwhile, when these values fall in the region of the left lower side of the thin solid line, the disconnection judgment is not performed. In this case, it becomes possible to arbitrarily determine whether or not the voltage is converted (forcibly) into the temperature and output.

Similarly, it is possible to set conditions for determining whether or not short-circuit can be judged. As described above with reference to FIG. 3, when the thermistor 20 indicates a voltage of 0.2V or below, the occurrence of short-circuit is predicted. This corresponds to a case where the temperature is 90 degrees C. or more. Accordingly, for simplicity, when the empty hydrogen tank 16 is charged with the hydrogen gas, the propriety of the performance of short-circuit detection may be judged based on the possibility that the temperature of hydrogen gas, which in the initial sate was in a temperature equilibrium state, increases to exceed 90 degrees C. Specifically, when there is a possibility of having a temperature of 90 degrees C. or more, a determination is made not to perform short-circuit judgment, and when there is no possibility of having a temperature of 90 degrees C. or more, a determination is made to perform short-circuit judgment.

Conditions for occurrence of short-circuit or disconnection may be evaluated by enhancing the accuracy of temperature prediction. As a specific example, there is an aspect of considering an effect that the hydrogen gas temperature becomes close to the ambient temperature with elapse of time in a hydrogen gas charging or discharging process. As another example, there is an aspect of evaluation of a temperature in the initial state based on the detected result of the thermistor 20 so as to be able to deal with a case when the hydrogen gas temperature and the ambient temperature are different in the initial state. However, since the temperature evaluation cannot be made properly in the initial state if disconnection or short-circuit has occurred in the thermistor 20, a requirement that the voltage of the thermistor 20 is in the temperature detectable range (0.2V to 4.9V) in the initial state would be required. As still another example, there can be shown an aspect of considering a state (state that internal pressure of hydrogen gas is higher than 0V and lower than 70 MPa) that the hydrogen tank 16 is not full or empty as the initial state. Thus, when the temperature prediction accuracy is enhanced, a range within which short-circuit judgment or disconnection judgment can be performed is increased.

The example of determining the conditions for determining whether the failure judgment can be made depending on the temperature predicted in the hydrogen tank 16 is described above. However, it is also possible to adopt another procedure. Namely, there is an aspect that the judgment threshold for determining whether or not a failure is to be determined is determined according to the temperature predicted within the hydrogen tank 16. This aspect can be adopted in addition to the judgment whether or not the above-described failure judgment can be performed or can also be performed instead of the judgment whether or not the failure judgment can be performed.

A specific example is described with reference to the graph of FIG. 3. As shown in the graph of FIG. 3, the thermistor 20 normally has the range from −30 degrees C. to 90 degrees C. (range of 4.9V to 0.2V) as a temperature detectable range. When the temperature is indicated as −30 degrees C. or below (4.9V or more), disconnection is judged to have occurred, and when the temperature is indicated as 90 degrees C. or more (0.2V or less), short-circuit is judged to have occurred. Then, this judgment threshold is changed according to a predicted temperature or conditions (conditions given by an internal pressure, a maximum internal pressure change, an ambient temperature, or the like) which provide the predicted temperature. For example, if there is a possibility that the hydrogen tank 16 has an internal temperature of −40 degrees C., it is judged as disconnection if voltage (4.92V) corresponding to −40 degrees C. is exceeded, and if there is a possibility that the hydrogen tank 16 has reached an internal temperature of 100 degrees C., it is judged as short-circuit if a voltage becomes lower than the voltage (0.17V) corresponding to 100 degrees C.

The disconnection and short-circuit were described above as a failure judgment example. However, if the failure is assumed to be a failure based on the fact that the voltage of the thermistor 20 is within a predetermined range, it becomes possible to judge the performance or non-performance of failure judgment in the same manner as for disconnection and short-circuit. In the above description, the temperature detection of the hydrogen tank 16 mounted on the fuel-cell car 10 is exemplified, but this embodiment can also be applied to a high-pressure tank for storing another gas or liquid. In addition, this embodiment can also be applied to temperature detection of a high-pressure tank not mounted on a vehicle.

The invention claimed is:

1. A high-pressure tank temperature detection system comprising:
    a temperature sensor for detecting a temperature in a high-pressure tank into which a high-pressure fluid is charged; and
    judgment unit for performing failure judgment of the temperature sensor according to a failure judgment condition, wherein:
    the failure judgment condition includes a first condition to determine whether or not the failure judgment can be made and a second condition to judge whether or not a failure exists when the failure judgment can be made; and at least the first condition is determined according to a fluid amount or its variation amount in the high-pressure tank, thereby the failure judgment condition is determined according to a fluid amount or its variation amount in the high-pressure tank, wherein the temperature detection system is provided with an estimation unit for estimating a temperature in the high-pressure tank according to a fluid amount or its variation amount in the high-pressure tank independent of the temperature sensor; and the first condition is a condition to determine that the failure judgment can be made when the temperature estimated by the estimation unit is within a range where temperature detection can be made by the temperature sensor, thereby the first condition is determined according to a fluid amount or its variation amount in the high-pressure tank.

2. The high-pressure tank temperature detection system according to claim 1, further comprising:
an acquisition unit for acquiring an ambient temperature around the high-pressure tank, wherein:
the estimation unit estimates a temperature in the high-pressure tank further in accordance with the ambient temperature.

3. The high-pressure tank temperature detection system according to claim 1, wherein the fluid to be charged into the high-pressure tank is in the form of gas.

4. The high-pressure tank temperature detection system according to claim 1, wherein the temperature sensor is a thermistor.

5. The high-pressure tank temperature detection system according to claim 1, further comprising:
a unit for detecting a pressure in the high-pressure tank, wherein:
a fluid amount or its variation amount in the high-pressure tank is evaluated according to the detected pressure or pressure change.

6. The high-pressure tank temperature detection system according to claim 1, wherein:
the variation amount is evaluated according to a difference between the fluid amount in the high-pressure tank and a reference fluid amount.

7. The high-pressure tank temperature detection system according to claim 1, further comprising:
matching information for matching a fluid amount or its variation amount in the high-pressure tank and feasibility of the failure judgment, according to the first condition, wherein:
the judgment unit performs failure judgment of the temperature sensor according to the matching information.

8. The high-pressure tank temperature detection system according to claim 7, further comprising:
an acquisition unit for acquiring an ambient temperature around the high-pressure tank, wherein:
the matching information performs matching of the fluid amount or its variation amount in the high-pressure tank, the ambient temperature, and feasibility of the failure judgment.

9. A high-pressure tank system, comprising:
the high-pressure tank temperature detection system according to claim 1, and
the high-pressure tank.

10. A high-pressure tank temperature detection system comprising:
a temperature sensor for detecting a temperature in a high-pressure tank into which a high-pressure fluid is charged; and
judgment unit for performing failure judgment of the temperature sensor according to a failure judgment condition, wherein:
the failure judgment condition includes a first condition to determine whether or not the failure judgment can be made and a second condition to judge whether or not a failure exists when the failure judgment can be made; and
at least the first condition is determined according to a fluid amount or its variation amount in the high-pressure tank, thereby the failure judgment condition is determined according to a fluid amount or its variation amount in the high-pressure tank,
wherein the variation amount is evaluated according to a difference between the fluid amount in the high-pressure tank and a reference fluid amount.

* * * * *